(12) United States Patent
Sato et al.

(10) Patent No.: US 11,020,787 B2
(45) Date of Patent: Jun. 1, 2021

(54) WORKPIECE PLACEMENT PLATFORM DEVICE HAVING WORKPIECE POSITIONING MEMBER MOVABLE IN AND OUT RELATIVE TO UPPER SURFACE OF PLACEMENT PLATFORM

(71) Applicant: AMADA HOLDINGS CO., LTD., Kanagawa (JP)

(72) Inventors: Masaaki Sato, Kanagawa (JP); Iwao Hayashi, Kanagawa (JP); Masashi Shirota, Kanagawa (JP); Takeshi Washio, Kanagawa (JP); Naoyuki Okamoto, Kanagawa (JP)

(73) Assignee: AMADA HOLDINGS CO., LTD., Kanagawa (JP)

( * ) Notice: Subject to any disclaimer, the term of this patent is extended or adjusted under 35 U.S.C. 154(b) by 0 days.

(21) Appl. No.: 16/603,989

(22) PCT Filed: Apr. 10, 2018

(86) PCT No.: PCT/JP2018/015047
§ 371 (c)(1),
(2) Date: Oct. 9, 2019

(87) PCT Pub. No.: WO2018/190335
PCT Pub. Date: Oct. 18, 2018

(65) Prior Publication Data
US 2020/0147668 A1    May 14, 2020

(30) Foreign Application Priority Data

Apr. 12, 2017  (JP) .............................. JP2017-078672

(51) Int. Cl.
*B23Q 3/18*      (2006.01)
*B21D 43/00*   (2006.01)
(Continued)

(52) U.S. Cl.
CPC ............. *B21D 43/003* (2013.01); *B23Q 3/18* (2013.01); *B21D 5/0281* (2013.01); *B21D 43/22* (2013.01); *B23Q 7/18* (2013.01); *B65G 57/00* (2013.01)

(58) Field of Classification Search
CPC .... B21D 43/003; B21D 5/0281; B21D 43/22; B23Q 3/18; B23Q 7/18; B65G 57/00
(Continued)

(56) References Cited

U.S. PATENT DOCUMENTS

| 3,667,334 A | 6/1972 | Brunett | |
| 10,730,097 B2 * | 8/2020 | Walti | ..................... B21D 28/04 |

(Continued)

FOREIGN PATENT DOCUMENTS

| JP | 60-166505 | 11/1985 |
| JP | 2001-105267 | 4/2001 |

(Continued)

OTHER PUBLICATIONS

Extended European Search Report for European Application No. 18784532.6 dated Mar. 30, 2020.
(Continued)

*Primary Examiner* — Joseph J Hail
*Assistant Examiner* — Shantese L McDonald
(74) *Attorney, Agent, or Firm* — Greenblum & Bernstein, P.L.C.

(57) ABSTRACT

A workpiece placement platform device including: an X-axis direction positioning member provided on one side of a placement platform on which to place a plate-shaped workpiece and configured to position one side edge of the workpiece in an X-axis direction by contacting the one side edge; a Y-axis direction positioning member provided on another side of the placement platform and configured to position another side edge of the workpiece in a Y-axis (Continued)

direction by contacting the another side edge; and a workpiece positioning member that is movable in and out relative to a workpiece placement surface of the placement platform and configured to partition the workpiece placement surface into sections in the X-axis direction and enable simultaneous positioning at the sections on the workpiece placement surface.

6 Claims, 5 Drawing Sheets

(51) Int. Cl.
*B21D 5/02* (2006.01)
*B21D 43/22* (2006.01)
*B23Q 7/18* (2006.01)
*B65G 57/00* (2006.01)

(58) Field of Classification Search
USPC .......................................... 269/60, 55, 58, 71
See application file for complete search history.

(56) References Cited

U.S. PATENT DOCUMENTS

2014/0131167 A1   5/2014  Dörr
2017/0368653 A1*  12/2017  Baumann ............... B23Q 5/385
2018/0193969 A1*  7/2018  Corradini .................. B24B 7/22

FOREIGN PATENT DOCUMENTS

JP   2001-105267    *  1/2006  ............... B23Q 3/18
JP   2014-155965       8/2014
WO   2016/162078       10/2016

OTHER PUBLICATIONS

Office Action issued in Japan Counterpart Patent Appl. No. 2017-078672, dated Jul. 4, 2018, along with English translation.
Office Action issued in Japan Counterpart Patent Appl. No. 2017-078672, dated Sep. 27, 2018, along with English translation.
International Search Report issued in International Patent Application No. PCT/JP2018/015047, dated Jul. 17, 2018, along with English translation.
Written Opinion of the International Search Authority issued in International Counterpart Patent Appl. No. PCT/JP2018/015047, dated Jul. 17, 2018, along with English translation.

* cited by examiner

WORKPIECE PLACEMENT PLATFORM DEVICE HAVING WORKPIECE POSITIONING MEMBER MOVABLE IN AND OUT RELATIVE TO UPPER SURFACE OF PLACEMENT PLATFORM

TECHNICAL FIELD

The present invention relates to a workpiece placement platform device on which to place a stack of plate-shaped workpieces for feeding each of the workpiece to a plate material processing machine such as a laser processing machine or a press brake, for example. More specifically, the present invention relates to a workpiece placement platform of a workpiece placement platform device with a workpiece positioning member which is provided to be movable in and out relative to the workpiece placement surface of the placement platform for placing workpieces on the placement platform in the work placement device, and which, in the case where the workpieces are, for example, precut small workpieces such as cut materials, partitions the workpiece placement surface into sections and positions the workpieces.

BACKGROUND ART

An industrial robot is sometimes used as a plate material feed device to feed plate-shaped workpieces to a plate material processing machine such as a press brake, for example. In this case, in order to accurately set the workpieces at a feed position relative to the plate material processing machine, the workpieces are positioned by contacting workpiece positioning members on the workpiece placement surface of the workpiece placement platform. Then, the workpiece thus positioned is sucked and fed by a vacuum pad or the like provided to the plate material feed device (see Patent Literature 1, for example).

CITATION LIST

Patent Literature

Patent Literature 1: Japanese Patent Application Publication No. 2014-155965

In the configuration described in Patent Literature 1, work materials are positioned in the Y-axis direction by causing their Y-axis reference edges in the Y-axis direction to contact Y-axis reference members provided to a loading device. Moreover, the work materials are positioned in the X-axis direction by causing their X-axis reference edges to contact an X-axis reference member. In short, in the configuration described in Patent Literature 1, the work materials are positioned by causing the work materials' X and Y reference edges, perpendicular to each other, to contact the X- and Y-axis reference members. Hence, with the configuration described in Patent Literature 1, the work materials are accurately positioned in the X-axis direction and the Y-axis direction on the loading device.

In the configuration described in Patent Literature 1, large work materials long in the X-axis direction are the processing targets, as illustrated in FIG. 2. Then, in the case of positioning small workpieces short in the X-axis direction, for example, workpieces in the first stack contact the above-mentioned X-axis reference member and Y-axis reference members and are therefore accurately positioned in the X-axis direction and the Y-axis direction.

However, while workpieces in the second stack contact the Y-axis reference members and are therefore accurately positioned in the Y-axis direction, they cannot contact the X-axis reference member and are therefore difficult to accurately position in the X-axis direction.

SUMMARY OF INVENTION

Thus, an object of the present invention is to provide a workpiece placement platform device having a workpiece positioning member movable in and out relative to the upper surface of a placement platform on which to place workpieces.

An aspect of the present invention provides a workpiece placement platform device including: an X-axis direction positioning member provided on one side of a placement platform on which to place a plate-shaped workpiece and configured to position one side edge of the workpiece in an X-axis direction by contacting the one side edge; a Y-axis direction positioning member provided on another side of the placement platform and configured to position another side edge of the workpiece in a Y-axis direction by contacting the another side edge; and a workpiece positioning member that is movable in and out relative to a workpiece placement surface of the placement platform and configured to partition the workpiece placement surface into sections in the X-axis direction or the Y-axis direction.

Also, preferably, the workpiece placement platform device further includes: an in-out member on the one side or the another side of the placement platform, the in-out member being movable in and out relative to the workpiece placement surface; and a workpiece positioning member that is provided to the in-out member so as to be capable of being laid down and is capable of positioning the one side edge or the another side edge of the workpiece by contacting the one side edge or the another side edge.

Also, preferably, in the workpiece placement platform device, the workpiece positioning member is provided such that a position thereof is adjustable in a longitudinal direction of the in-out member.

Also, preferably, in the workpiece placement platform device, the workpiece positioning member is configured to move in and out relative to the workpiece placement surface by pivoting horizontally.

Also, preferably, in the workpiece placement platform device, a position of the workpiece positioning member is adjustable in the X-axis direction or the Y-axis direction.

According to the present invention, the workpiece positioning member which partitions the workpiece placement surface of the placement platform into sections is provided to be movable in and out relative to the workpiece placement surface. Thus, when the workpiece positioning member is not used, large workpieces can be placed and positioned on the workpiece placement surface. Further, in the case where the workpieces are small, some workpieces placed on the workpiece placement surface are positioned using the workpiece positioning member. In this case, the workpiece placement surface of the placement platform is partitioned and used as sections. This reduces wasted regions on the workpiece placement surface. Accordingly, more workpieces can be placed and positioned.

DESCRIPTION OF EMBODIMENT

Figure 1:
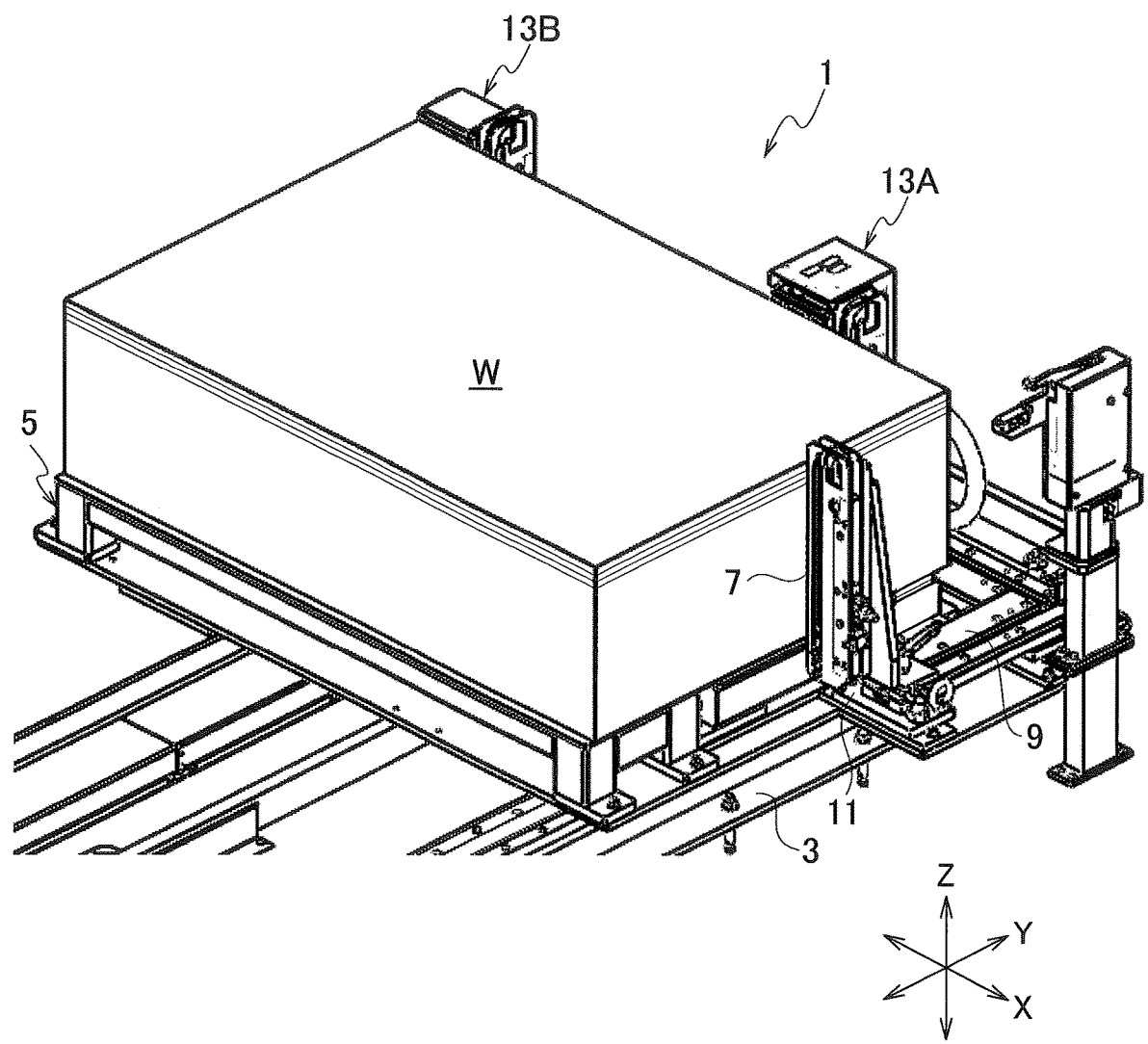
FIG. 1 is a perspective view schematically illustrating the configuration of a workpiece placement platform device according to an embodiment of the present invention.

Referring to FIG. 1, a workpiece placement platform device 1 according to an embodiment of the present invention has a mount 3. On this mount 3, a placement platform 5 is provided on which to place a stack of plate-shaped workpieces W. Moreover, on one side of the placement platform 5, there is provided an X-axis direction positioning member 7 for positioning one side edge (side edge in the X-axis direction) of the stack of workpieces W on the placement platform 5 by contacting the one side edge. The X-axis direction positioning member 7 is provided such that its position is adjustable in the Y-axis direction according to the size of the workpieces W.

Specifically, the mount 3 is provided with a Y-axis direction guide member 9. Further, on this guide member 9, a positioning block 11 integrally provided with the X-axis direction positioning member 7 is provided such that its position is movable. Thus, the position of the X-axis direction positioning member 7 is adjustable according to the size of the workpieces W in the Y-axis direction.

Also, on another side of the placement platform 5, there are a plurality of Y-axis direction positioning members 13A and 13B that position another side edge (side edge in the Y-axis direction) of the stack of workpieces W on the placement platform 5 by contacting the side edge, the Y-axis direction positioning members 13A and 13B being spaced from each other in the X-axis direction. Thus, when the workpieces W on the placement platform 5 are positioned by contacting the X-axis direction positioning member 7 and the Y-axis direction positioning members 13A and 13B, the workpieces W are accurately positioned in the X-axis and Y-axis directions.

Figure 2:
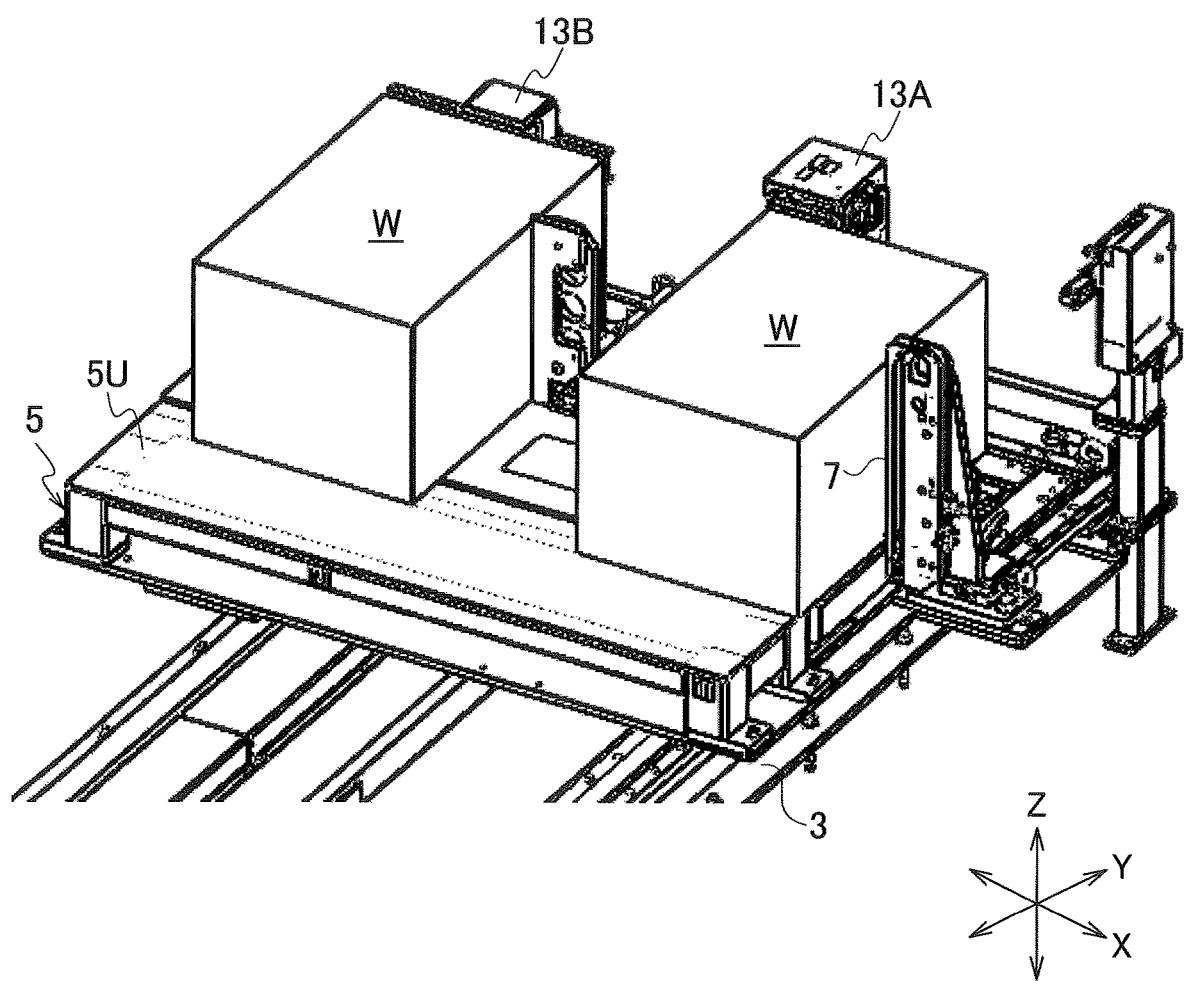
FIG. 2 is a perspective view illustrating a state where cut materials are placed and positioned at two position on a workpiece placement platform.

Meanwhile, FIG. 1 exemplarily illustrates a case where large workpieces W with substantially the same dimensions as the placement platform 5 are placed on an upper surface (workpiece placement surface) 5U of the placement platform 5. However, there is a case where, as illustrated in FIG. 2, precut small cut materials with ordered dimensions are placed and these workpieces W are caused to contact the X-axis direction positioning member 7 and one Y-axis direction positioning member 13A to position the workpieces W.

In this case, there is an empty space on the other Y-axis direction positioning member 13B side of the upper surface 5U of the placement platform 5. In a case where similar cut materials (workpieces) W are placed in this empty space. they can be positioned in the Y-axis direction by contacting the Y-axis direction positioning member 13B. For the empty space, however, there is not any positioning member equivalent to the X-axis direction positioning member 7. For this reason, the workpieces W placed in the empty space are difficult to position in the X-axis direction.

Here, it is possible to provide a positioning member equivalent to the X-axis direction positioning member 7 at a position for the empty space. In this case, however, this positioning member will need to be detached if workpieces W are to be placed on the entire upper surface of the placement platform 5 as illustrated in FIG. 1. In other words, in the case where an X-axis direction positioning member is provided for the empty space, it is necessary to attach or detach the X-axis direction positioning member depending on the size of the workpieces W. The X-axis direction positioning member is made of metal and is heavy, the work of attaching or detaching the X-axis direction positioning member is troublesome.

For this reason, in this embodiment, the X-axis direction positioning member for the empty space is configured to be easily movable in and out relative to the workpiece placement surface of the placement platform 5.

Specifically, one Y-axis direction positioning member 13B is provided such that its position is adjustable in the X-axis direction. Further, a support pillar 15 (see FIG. 3) is provided on an end side of the mount 3 in the Y-axis direction at a position away from the Y-axis direction positioning member 13A, and an upper guide member 17 extending horizontally in the X-axis direction is integrally provided on an upper portion of the support pillar 15.

Moreover, on the mount 3, a lower guide member 19 is provided in parallel to the upper guide member 17, the lower guide member 19 being located at a position below the upper guide member 17. Further, the Y-axis direction positioning member 13B is supported on the upper and lower guide members 17 and 19 such that its position is adjustable in the X-axis direction.

A support block 21 is provided between the Y-axis direction positioning members 13A and 13B around the end of the mount 3 in the Y-axis direction. The proximal end side of a pivot arm 23 is turnably provided on this support block 21, the pivot arm 23 being pivotable about a vertical axis. The pivot arm 23 forms an in-out member movable in and out relative to the upper surface (workpiece placement surface) 5U of the placement platform 5 by pivoting horizontally.

Meanwhile, the configuration that moves the in-out member (pivot arm 23) in and out relative to the upper surface 5U of the placement platform 5 can be a configuration that moves the in-out member in the Y-axis direction, instead of the configuration that pivots the in-out member horizontally as described above. The support block 21 is provided with a stopper 25 so that the longitudinal direction of the pivot arm 23 can be parallel to the Y-axis direction when the pivot arm 23 is positioned above the upper surface 5U of the placement platform 5. Thus, when the pivot arm 23 is pivoted and positioned above the upper surface of the placement platform 5, the pivot arm 23 contacts the stopper 25 and is hence positioned in parallel to the Y-axis direction.

On the upper surface of the pivot arm 23, there is provided a guide member 27 parallel to the longitudinal direction of the pivot arm 23. On this guide member 27, a slide block 29 is provided to be movable for adjustment. In order to fix the slide block 29 at an adjusted position, the slide block 29 is provided with a lock lever 31 having a fixing screw (not illustrated) capable of pressing (fastening) the guide member 27 with its distal end.

Thus, the slide block 29 can be moved along the guide member 27 for adjustment and fixed as the adjusted position.

Figure 3:
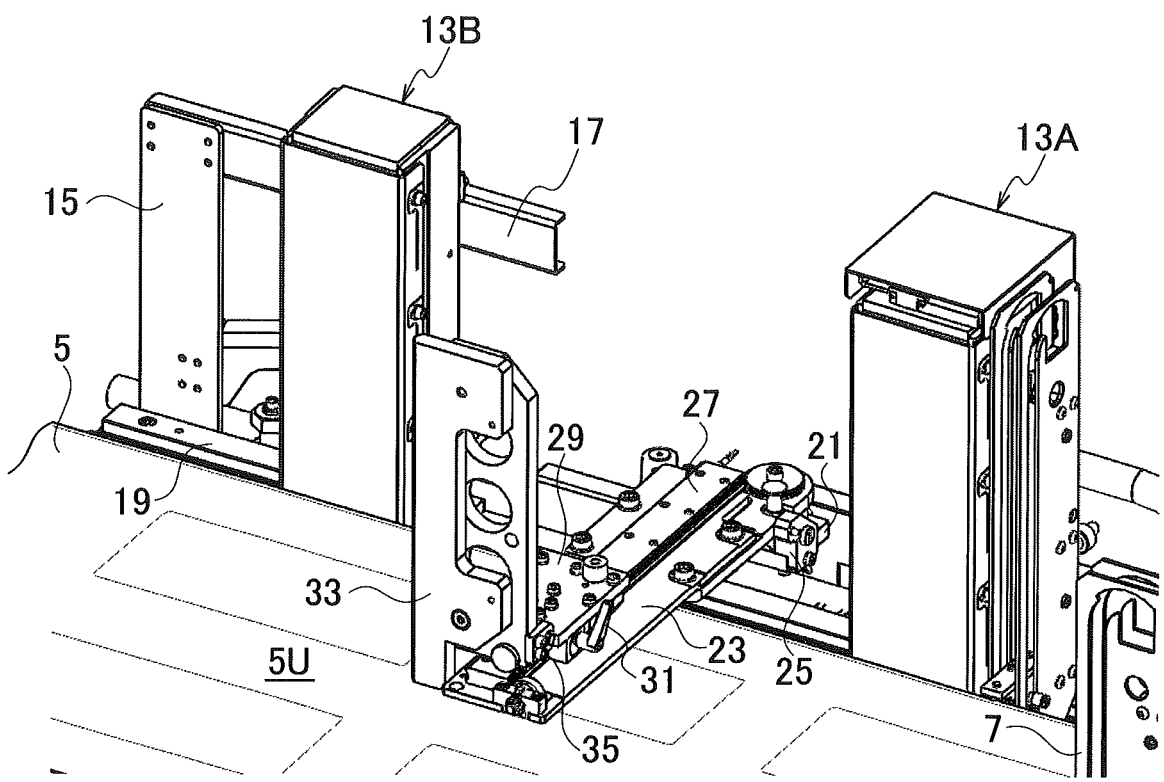
FIG. 3 is a perspective view illustrating a state a workpiece positioning member is positioned above the upper surface of the placement platform.
Figure 3:
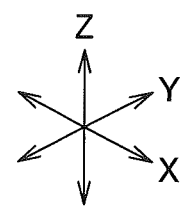
Figure 4:
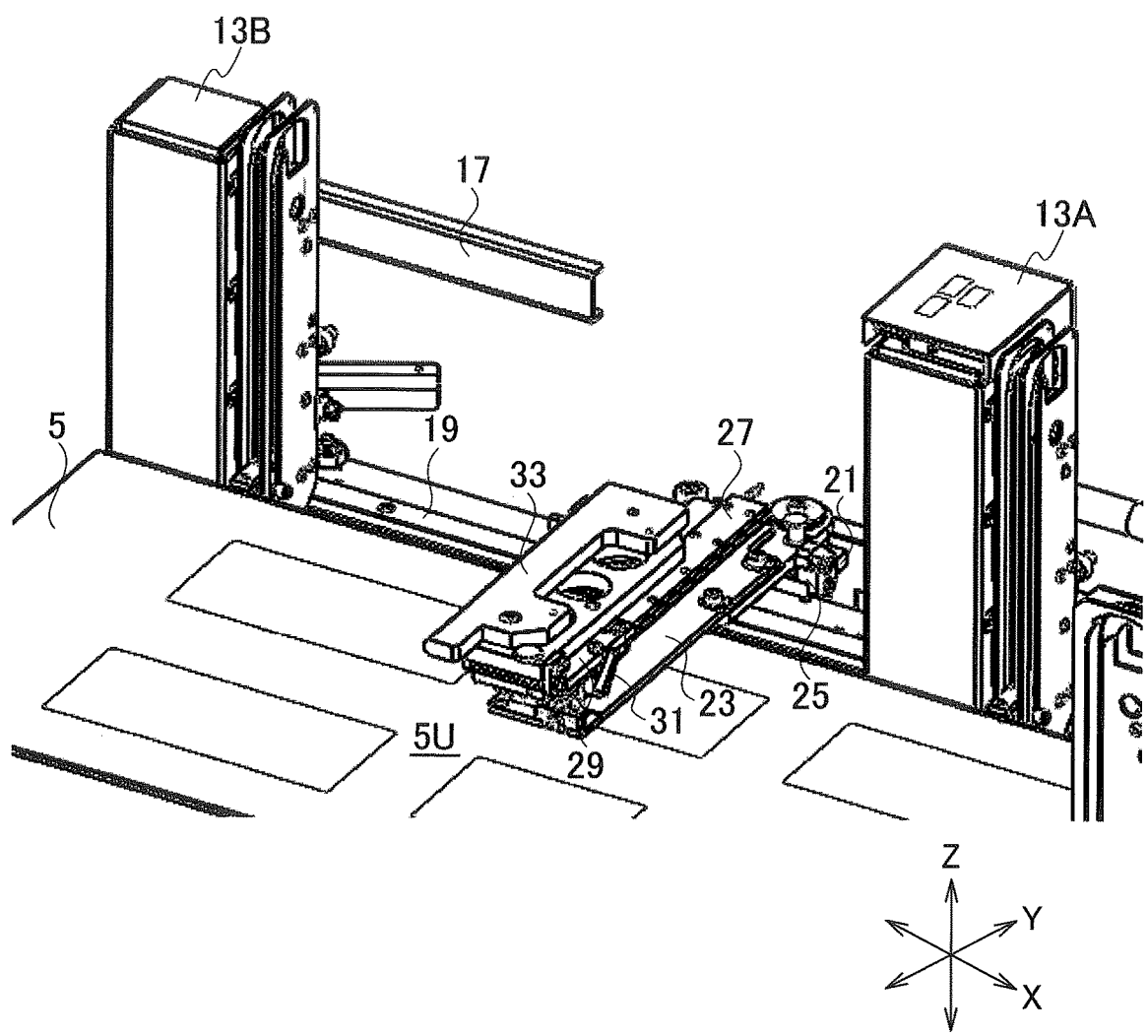
FIG. 4 is a perspective view illustrating a state where the workpiece positioning member is laid down.

The slide block 29 is provided with a workpiece positioning member 33 capable of positioning X-axis direction side edges of workpieces (cut materials) W placed on the placement platform 5 by contacting the side edges, the slide block 29 being provided to be capable of being laid down. Specifically, the slide block 29 is provided with a pivot shaft 35 in the X-axis direction, and the workpiece positioning member 33 pivotally supported on this pivot shaft 35. Hence, the workpiece positioning member 33 is pivotable into an upright state, as illustrated in FIG. 3, and a state of being laid down over the guide member 27, as illustrated in FIG. 4.

Figure 5:
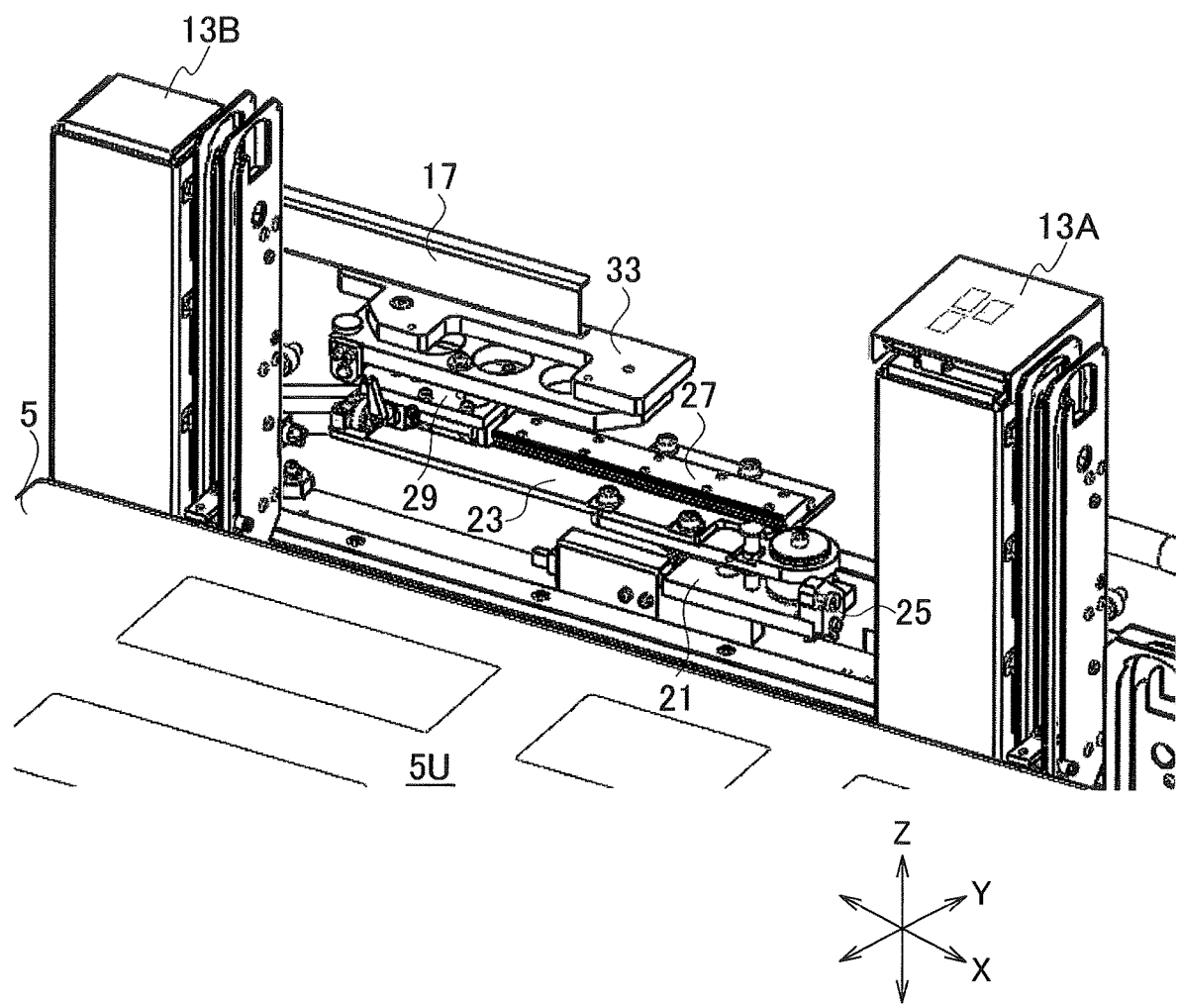
FIG. 5 is a perspective view illustrating a state where the workpiece positioning member is pivoted horizontally to be retracted from the upper surface of the placement platform.

By horizontally pivoting the pivot arm 23 with the workpiece positioning member 33 in the above laid state, the workpiece positioning member 33 can be retracted to the outside of the upper surface 5U of the placement platform 5, as illustrated in FIG. 5. In other words, the workpiece positioning member 33 can be moved in and out relative to the workpiece placement surface (upper surface) 5U of the placement platform 5 by pivoting the pivot arm 23.

Meanwhile, the support block 21 is desirably provided such that its position is adjustable in the X-axis direction according to dimensions of cut materials to be placed on the workpiece placement surface 5U of the placement platform 5. With such a configuration, it is possible to easily handle a case where the plurality of cut materials to be placed on the placement platform 5 have different dimensions.

As can be understood from the above description, according to this embodiment, large workpieces W of a fixed size can be placed on the upper surface 5U of the placement platform 5. Also, precut small cut materials can be placed on the placement platform 5. In this case, the workpiece positioning member 33 is positioned above the upper surface of the placement platform 5 and positions the cut materials. Thus, even when cut materials are placed at a plurality of positions, the cut materials are placed in an accurately positioned state in the X- and Y-axis directions.

Moreover, the workpiece positioning member 33 is movable in and out relative to the upper surface 5U of the placement platform 5 without being detached from the placement platform 5. Thus, even when the workpiece positioning member 33 is heavy, the workpiece positioning member 33 is easily movable in and out relative to the upper surface 5U of the placement platform 5.

What is claimed is:

1. A workpiece placement platform device comprising:
   an X-axis direction positioning member provided on one side of a placement platform on which to place a plate-shaped workpiece, wherein a position of the X-axis direction positioning member is adjustable along a Y-axis direction;
   a Y-axis direction positioning member provided on another side of the placement platform and configured to position another side edge of the workpiece in the Y-axis direction by contacting the another side edge; and
   a workpiece positioning member that is movable in and out horizontally from the another side of the placement platform relative to a workpiece placement surface of the placement platform and configured to partition the workpiece placement surface into sections in an X-axis direction, wherein
   the X-axis direction positioning member includes an X-axis direction contact portion configured to position one side edge of the workpiece in the X-axis direction by contacting the one side edge, and a position of the X-axis direction contact portion in the workpiece placement platform device is fixed in the X-axis direction.

2. The workpiece placement platform device according to claim 1, wherein the workpiece positioning member is configured to move in and out relative to the workpiece placement surface by pivoting horizontally.

3. The workpiece placement platform device according to claim 1, wherein a position of the workpiece positioning member is adjustable in the X-axis direction or the Y-axis direction.

4. A workpiece placement platform device comprising:
   an X-axis direction positioning member provided on one side of a placement platform on which to place a plate-shaped workpiece and configured to position one side edge of the workpiece in an X-axis direction by contacting the one side edge;
   a Y-axis direction positioning member provided on another side of the placement platform and configured to position another side edge of the workpiece in a Y-axis direction by contacting the another side edge;
   a workpiece positioning member that is movable in and out relative to a workpiece placement surface of the placement platform and configured to partition the workpiece placement surface into sections in the X-axis direction or the Y-axis direction; and
   an in-out member that is provided on the one side or the another side of the placement platform and that is movable in and out relative to the workpiece placement surface, wherein
   the workpiece positioning member that is provided to the in-out member so as to be capable of being laid down and is capable of positioning the one side edge or the another side edge of the workpiece by contacting the one side edge or the another side edge.

5. The workpiece placement platform device according to claim 4, wherein the workpiece positioning member is provided such that a position thereof is adjustable in a longitudinal direction of the in-out member.

6. A workpiece placement platform device comprising:
   an X-axis direction positioning member provided on one side of a placement platform on which to place a plate-shaped workpiece and configured to position one side edge of the workpiece in an X-axis direction by contacting the one side edge;
   a Y-axis direction positioning member provided on another side of the placement platform and configured to position another side edge of the workpiece in a Y-axis direction by contacting the another side edge;
   an in-out member that is movable in and out horizontally from the another side of the placement platform relative to a workpiece placement surface of the placement platform; and
   a workpiece positioning member that is movable in and out horizontally from the another side of the placement platform relative to the workpiece placement surface and configured to partition the workpiece placement surface into sections in the X-axis direction, wherein
   the workpiece positioning member is provided on the in-out member,
   a proximal end of the in-out member is turnably provided on a support member that is provided on the another side and has a pivot about which the in-out member is pivotable,
   the workpiece positioning member is configured to move in and out relative to the workpiece placement surface by pivoting horizontally about the pivot of the support member, and
   a position of the support member is adjustable along the X-axis direction.

* * * * *